March 22, 1949. W. B. FAIRFIELD 2,464,839
ARTICLE PROCESSING APPARATUS
Filed Sept. 28, 1945 3 Sheets-Sheet 1

INVENTOR
W. B. FAIRFIELD
BY Harry E. Duft
ATTORNEY

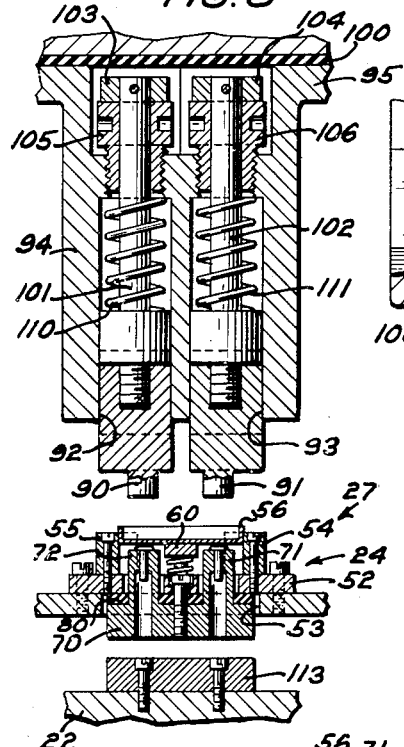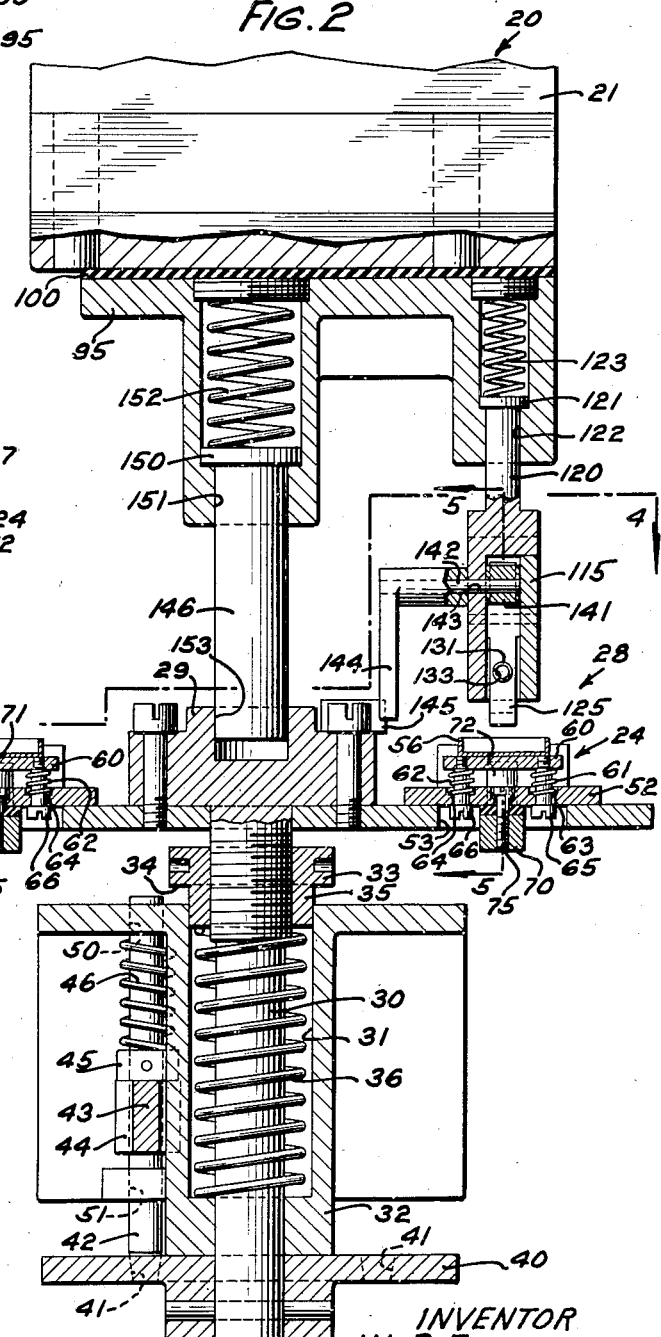

March 22, 1949. W. B. FAIRFIELD 2,464,839
ARTICLE PROCESSING APPARATUS
Filed Sept. 28, 1945 3 Sheets-Sheet 3
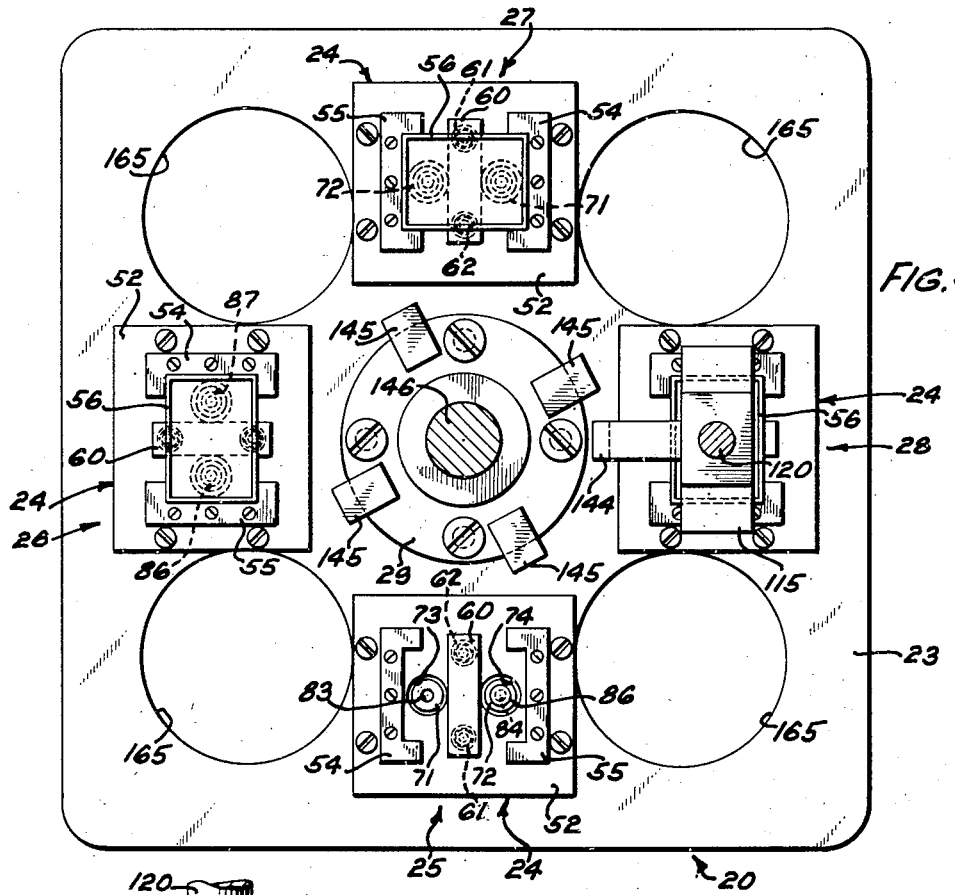
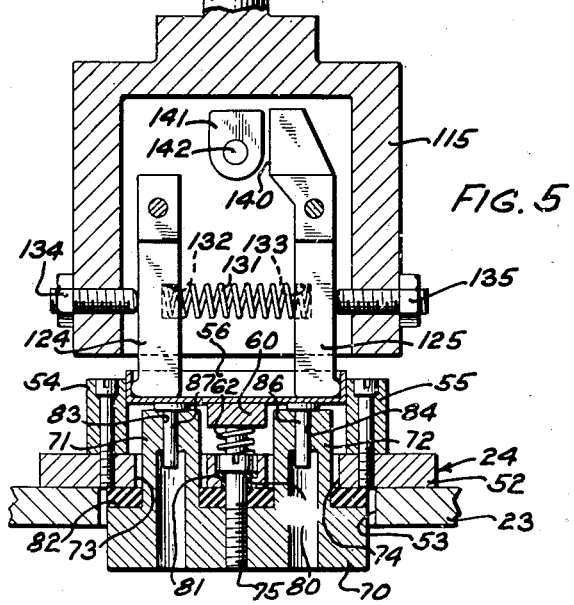
INVENTOR
W. B. FAIRFIELD
BY Harry C. Duft
ATTORNEY Patented Mar. 22, 1949

2,464,839

UNITED STATES PATENT OFFICE 2,464,839

ARTICLE PROCESSING APPARATUS

Walter B. Fairfield, La Grange, Ill., assignor to Western Electric Company, Incorporated, New York, N. Y., a corporation of New York Application September 28, 1945, Serial No. 619,128

9 Claims. (Cl. 219—4)

This invention relates to article processing apparatus and more particularly to automatic welding apparatus for welding studs to surfaces.

An object of this invention is to provide a new and efficient automatic welding apparatus and associated mechanism to eject the welded assembly.

In accordance with one embodiment of this invention, a conventional welding machine is provided with an indexible table having a plurality of fixtures adapted to hold flanged can covers in fixed alignment with studs to be welded thereon. At one station, the studs are welded to the covers by a reciprocating welding head, while at the next station an ejector, secured to the reciprocating head and having spring forced spreading fingers, lifts the can cover from the fixture and as the table is rotated the fingers are moved together to drop the cover into a receptacle.

A complete understanding of the invention will be had by reference to the following detailed description taken in conjunction with the accompanying drawings, in which Fig. 1 is a side elevation showing one embodiment of the invention incorporated in a conventional welding machine of which only portions of the head and the bed plate are shown;

Fig. 2 is a vertical section of the apparatus shown in Fig. 1 taken on the line 2—2 of Fig. 1 in the direction of the arrows;

Fig. 3 is a vertical section of a portion of the apparatus shown in Fig. 1, taken on the line 3—3 in the direction of the arrows, showing the welding contacts in section;

Fig. 4 is a plan sectional view of the apparatus taken on the line 4—4 of Fig. 2 in the direction of the arrows; and Fig. 5 is a vertical section taken on the line 5—5 of Fig. 2 in the direction of the arrows, showing the relationship of the ejector mechanism to one of the holding fixtures.

Figure 1:
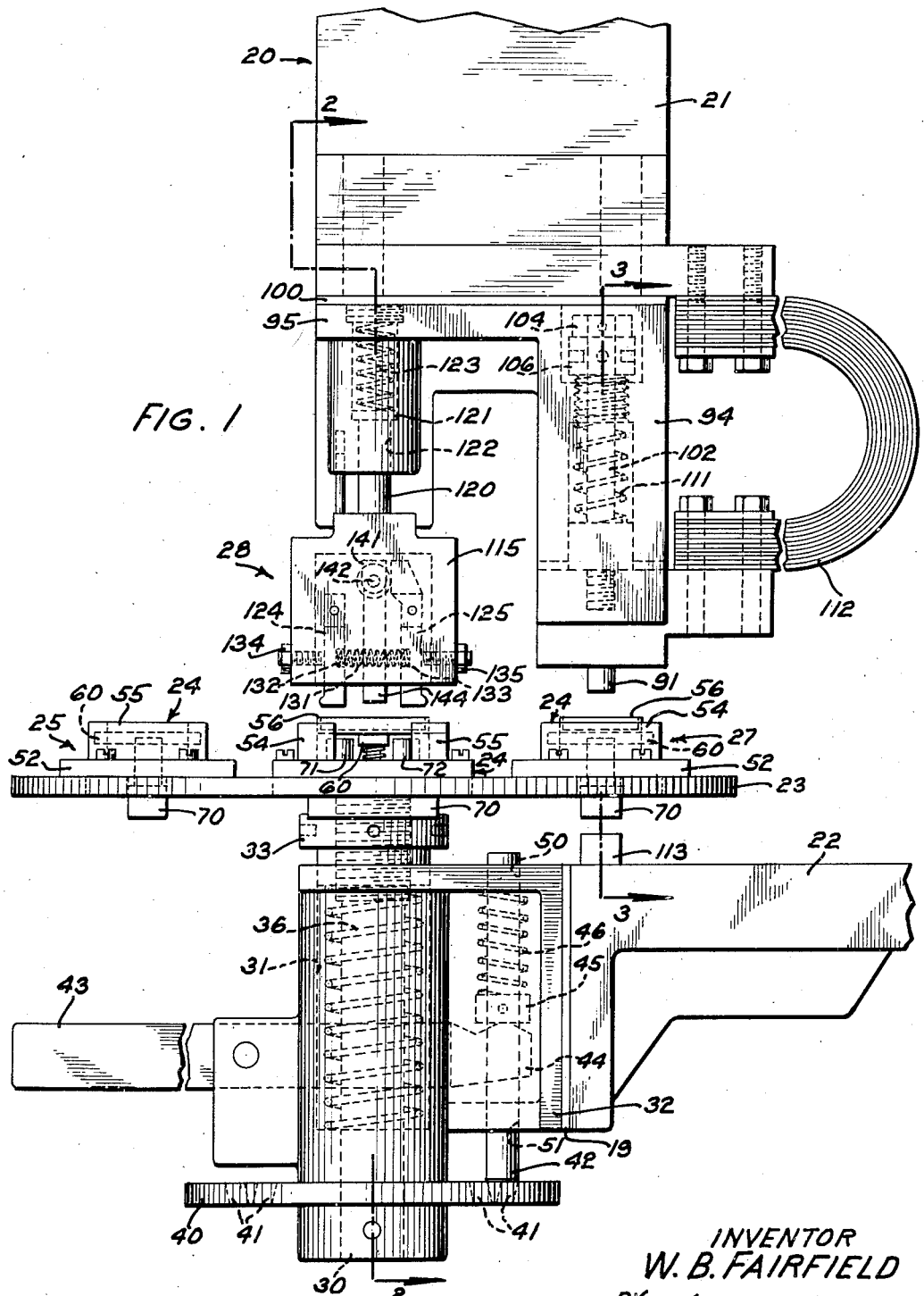

Referring to the drawings, it will be seen that a conventional electric resistance welding machine 20, only partly shown, having a reciprocable head 21 and a bed plate 22 is provided with an indexible table 23 adapted to be intermittently rotated to carry, in consecutive order, four identical assembly holding fixtures 24 (Fig. 4) mounted thereon from a loading station 25 to a second loading station 26, then to a welding station 27 and finally to an ejector station 28. The table 23 is secured to the head 29 (Figs. 2 and 4) of a shaft 30 which is reciprocably and rotatably positioned in a shouldered aperture 31 formed in an irregular shaped member 32 secured to the bed 22 of the welding machine 20. An insulating member 19 (Fig. 1) electrically insulates the bed 22 from the member 32. At its upper portion, the shaft 30 is threaded to engage the threads of a collar 33 having a lower portion 35 in slidable engagement with the walls of the aperture 31. A spring 36 disposed in the shouldered aperture 31 urges the shaft 30 upwardly thereby providing a yieldable mounting for the table 23. Downward movement of the shaft 30 with respect to the member 32 may be adjustably limited by the collar 33. The lower end of the shaft 30 is fixed to a locating plate 40 provided with four indexing apertures 41, which are positioned to successively receive a reciprocable locking pin 42, which may be raised by a manually operable lever 43 having a bifurcated end 44 engageable with a collar 45 fixed around the pin 42 which is in turn slidably mounted in apertures 50 and 51 formed in the member 32. A helical compression spring 46 which encircles the upper part of the pin 42 continuously urges the pin into engagement with the locating plate 40.

The holding fixtures 24 are identically constructed and are mounted equidistantly apart around the center of the table 23. Each of the holding fixtures 24 is provided with a base 52 (Figs. 2, 3 and 5) which is secured to the table 23 directly over a rectangular aperture 53 formed in the table 23. Secured to the base 52 are two oppositely disposed blocks 54 and 55 suitably shaped to receive a can cover 56 which is maintained in a horizontal plane by a platform 60 urged upwardly by two springs 61 and 62 disposed in shouldered apertures 63 and 64 formed in the base 52. The platform 60 is maintained in horizontal alignment by a pair of headed guide pins 65 and 66 slidably disposed in the apertures 63 and 64 and threadedly secured to the platform 60. A welding electrode 70 having hollow posts 71 and 72 (Fig. 5) extending through apertures 73 and 74 in the base 52 is secured to the lower side of the base 52 by means of a bolt 75 which is electrically insulated from the base by an insulating bushing 80 and an insulating washer 81. The electrode 70 is electrically insulated from the base 52 by an insulator 82 and by air gaps between the posts 71 and 72 and the walls of the apertures 73 and 74, respectively. The aperture 53 is large enough to provide an air gap between the walls of the aperture 53 and the electrode 70 to prevent an electrical short circuit between the table 23 and the electrode 70. Apertures 83 and 84 are provided in the posts 71 and 72 to receive shanks of studs 86 and 87 which are to be welded to the can cover 56. Normally, the can cover 56 which rests on the platform 60 does not contact the heads of the studs 86 and 87.

At the welding station 27 there is provided a pair of electrodes 90 and 91 (Fig. 3) reciprocably disposed in shouldered apertures 92 and 93 formed in a housing 94 which is part of a subhead 95 secured to the reciprocable head 21 and which is electrically insulated therefrom by an insulator 100. The electrodes 90 and 91 are attached to a pair of rods 101 and 102 having heads 103 and 104 which abut the top surfaces of a pair of adjustable bushings 105 and 106 that are threaded into the upper portions of the shouldered apertures 92 and 93. A pair of helical springs 110 and 111 positioned in the apertures 92 and 93, respectively, and encircling the shanks 101 and 102, respectively, normally urge the electrodes 90 and 91 downward and the downward displacement of the electrodes 90 and 91 with respect to the housing 94 is limited by the abutment of the heads 103 and 104 with the bushings 105 and 106, respectively, which may be adjusted to change the limits of the downward extension of the electrodes. A strap 112 electrically connects the electrodes 90 and 91 to the head 21 which in turn is connected to one side of the source of welding current (not shown).

A contacting block 113 is secured to the bed plate 22 in line with and below the electrodes 90 and 91. Electrical continuity is maintained between the contacting block 113 and the bed plate, which in turn is connected to the other side of the source of the welding current. There is sufficient space between the electrodes 90 and 91 and the contacting block 113 normally to allow the passage therebetween of the table 23 and the holding fixtures 24 in a horizontal plane. The table 23 is so indexed that at any locked position one of the holding fixtures is positioned between the electrodes 90 and 91 and the contacting block 113, the electrodes 90 and 91 being in a direct line with the posts 71 and 72, and the lower part of electrode 70 is directly above the contacting block 113.

The ejector station 28 is located 90° away from the welding station 27 on the arc of the circle having as its center the shaft 30 and the periphery of which passes through the holding fixtures. The ejecting mechanism is contained in a housing 115 secured to a rod 120 which has an abutment head 121 and which is reciprocably positioned in a shouldered aperture 122 formed in the sub-head 95. A helical spring 123 disposed in the aperture 122 continuously urges the rod 120 downward. A pair of fingers 124 and 125 (Fig. 5) are pivotally mounted within the housing 115 and extend downwardly through the open bottom of the housing. The ends of the fingers 124 and 125 which extend from the housing are continuously urged away from each other by a helical compression spring 131, the ends of which are disposed in apertures 132 and 133 formed in the fingers 124 and 125, respectively. Lateral outward movement of the fingers 124 and 125 is adjustably limited by a pair of set screws 134 and 135. The upper end of the finger 125 has a camming surface 140 which is engageable by a cam 141 fixed to a shaft 142 journalled in an aperture 143 (Fig. 2) formed in one side of the housing 115. A lever 144 is fixed to the shaft 142 and will be rocked (Fig. 2) upon being engaged by a lug 145 on the shaft head 29 when the table is rotated. When lever 144 is rocked clockwise (Fig. 1) the cam 141 will engage the camming surface 140 of the finger 125, thereby forcing the lower end of the finger 125 toward the finger 124 against the action of the spring 131. There are four of the lugs 145 disposed about the shaft head whereby in each rotation of the table the fingers will release four times.

When the head 21 is lowered to perform a welding operation, a limited amount of reciprocation is imparted to the table 23 by a rod 146 having an abutment head 150 and which is reciprocably positioned within a shouldered aperture 151 formed in a portion of the sub-head 95. Normally, the rod 146 is urged downward by a helical compression spring 152 disposed in the aperture 151 and its lower end is slidable in a cylindrical guide cavity 153 formed in the shaft head 29.

In the operation of the apparatus, an operator first inserts the shank of a headed stud 86 into the aperture 84 of the post 72 of a holding fixture at the first loading station 25 which is diametrically opposite the welding station 27 (Fig. 4). The holding fixture is then moved to the second loading station 28 by rotating the table 23 90° in a clockwise direction. To rotate the table 23 the lever 43 is operated to raise the locking pin 42, thereby releasing the locating plate 40, permitting the operator to rotate the table 23. After the 90° rotation of the table the locating plate is again locked in position by the pin 42 cooperating with one of the apertures 41. At the second loading station 26 a second headed stud 87 is inserted in the aperture 83 of the post 71 and a flanged cover 56 is placed flange upward in the holding fixture between the blocks 54 and 55. Then the table 23 is again rotated 90° in a clockwise direction, carrying the holding fixture to the welding station 27, where the locating plate 40 is again locked in position by the pin 42.

At the welding station 27 the head 21 is moved vertically downward, by means not shown, causing the rod 146 to strike the bottom of the cavity 153 in the shaft head 29 and by continued movement of the head 21 will resiliently force the table 23 downward until the abutting surface 34 of the collar 33 engages the top of the member 32. At the end of this movement the welding electrode 70 contacts the contact block 113 and as the head 21 continues downward the electrodes 90 and 91 contact the can cover 56, forcing the cover downward against the action of the springs 61 and 62 until the cover touches the heads of the studs 86 and 87, thereby preparing the circuit to effect a weld, whereupon the current is supplied to make the weld and then the head 21 is moved upwardly, as is usual in welding apparatus of this general type.

The table 23 is again rotated clockwise 90° to carry the holding fixture and the welded cover to the ejecting station 28. The head 21 is again operated downward until the fingers 124 and 125 engage the edges of the cover and are cammed together against the action of the spring 131 to grip the cover 56 by its flanges, whereupon the head 21 is raised, carrying the ejecting mechanism and the can cover upward. Subsequent clockwise rotation of the table 23 causes one of the lugs to engage the lever 144, thereby rocking the cam 141 into engagement with the camming surface 140 of the finger 125, which action forces the fingers 124 and 125 together, thereby releasing the cover 56 which drops into a hopper through one of a series of suitably positioned apertures 165 formed in the table 23.

It will be apparent that since this embodiment utilizes four holding fixtures, each holding fixture may be loaded as it stops at the loading stations, and that a continuing number of can covers may be consecutively processed through the apparatus.

What is claimed is:

1. In a welding apparatus, a reciprocable welding head, a bed plate to cooperate with said welding head to weld parts, a rotatably mounted table adapted to rotate between said welding head and said bed plate, a holding fixture mounted on said table for holding parts to be welded, an ejecting mechanism secured to said head comprising a plurality of spring pressed fingers for picking up welded assembly from said holding fixture, and means operable to engage portions of said table upon rotation of said table to actuate the said fingers to release said welded assembly.

2. In a processing apparatus, a reciprocable head, a bed plate to cooperate with said head to process parts, a rotatable table mounted between said head and said bed plate, a holding fixture mounted on said table to hold a part to be processed, an ejecting mechanism secured to and responsive to reciprocation of said head to pick up and release said part after being processed, said ejecting mechanism comprising an adjustably fixed finger, a movably mounted finger having a camming surface, resilient means to urge said fingers apart, a cam engageable with said camming surface to force the said fingers toward each other, a lever connected to said cam, and lugs secured to said table to actuate said lever when said table is rotated, thereby releasing said part.

3. In a processing apparatus, a reciprocable head, a bed plate to cooperate with said head to process parts, a rotatable table mounted between said head and said bed plate, a holding fixture mounted on said table to hold a part to be processed, a resiliently mounted platform secured to said holding fixture to maintain said part in a predetermined position, an ejecting mechanism secured to and responsive to reciprocation of said head to pick up and release said part after being processed, said ejecting mechanism comprising an adjustably fixed finger, a movably mounted finger having a camming surface, a resilient means to urge said fingers apart, a cam engageable with said camming surface to force the said fingers toward each other, a lever connected to said cam, and lugs secured to said table to actuate said lever when said table is rotated, thereby releasing said part.

4. A welding apparatus comprising a movable welding head, a bed plate to cooperate with said welding head to process a part by welding, a movable table adapted to move between said welding head and said bed plate, a loading fixture secured to said table to receive a part to be processed by welding, an ejecting mechanism movable relative to said table and secured to said welding head, said ejecting mechanism comprising a supporting member, a fixed finger, a pivotally mounted finger, resilient means to normally urge the fingers to grip extending portions of said processed part, and means engageable with portions of said table and responsive to the movement of said table to operate said fingers to release said processed part.

5. An article processing apparatus comprising a movable processing member, a stationary processing member to cooperate with said movable processing member to process an article, a movable table adapted to move between said processing members along a predetermined course, a holding fixture secured to said table to support and carry an article to be processed, an ejecting mechanism movable relative to said table and comprising a stationary holding member, a resiliently urged movable holding member to cooperate with the said stationary holding member to grip and pick up a processed article, and means engageable with portions of said table and responsive to the movement of said table to actuate said movable holding member to release said processed article.

6. An article processing apparatus comprising a movable head, a bed plate to cooperate with said movable head to process an article, means to support and carry in a predetermined path an article to be processed between said head and said bed plate, an ejecting mechanism movable relative to said article supporting means comprising resilient means to grip and pick up a processed article, and means operable to disengage said processed article from said resilient gripping means.

7. An article processing apparatus comprising a movable processing member, a complementary processing member to cooperate with the first said processing member to process an article, means to support and carry an article along a predetermined path to permit the article to be processed by said processing members, an ejecting mechanism relatively movable with respect to said article carrying member comprising a fixed finger, a resiliently urged movable finger to cooperate with said fixed finger to grip and pick up the processed article, and means movable by said article carrying means to actuate said movable finger to release said processed article.

8. In an article processing apparatus, a movable table adapted to carry and support an article to be processed, an ejecting mechanism relatively movable with respect to said table, said ejecting mechanism comprising a supporting member, a plurality of resiliently urged relatively movable holding members adapted to frictionally engage and pick up a processed article, and means engageable with portions of said table and responsive to the movement of said table to actuate said holding members to release said processed article.

9. In an article processing apparatus, an indexible table movable in a predetermined path and having projecting lugs and also having means for supporting and carrying an article to be processed, an ejecting mechanism disposed along said path and being relatively movable with respect to said table, said ejecting mechanism comprising a supporting member, a pair of relatively movable members mounted on said support, resilient means to urge said movable members into a predetermined spaced-apart relation, said movable members being adapted to frictionally engage extending portions of an article when said ejecting mechanism is moved toward said table, and means engageable with one of said movable members and upon movement of said table with said projecting lugs to operate said movable members to disengage said article from said movable members after said ejecting mechanism has been moved away from said table.

WALTER B. FAIRFIELD.

REFERENCES CITED

The following references are of record in the file of this patent:

UNITED STATES PATENTS

| Number | Name | Date |
| --- | --- | --- |
| 1,913,029 | Holmes | June 6, 1933 |
| 2,338,002 | Mero | Dec. 28, 1943 |